United States Patent [19]

Degoix et al.

[11] Patent Number: 4,623,495
[45] Date of Patent: Nov. 18, 1986

[54] METHOD AND APPARATUS FOR MANUFACTURING AN OPTICAL FIBER CABLE

[75] Inventors: Bernard Degoix; Daniel Boussemaer, both of Calais, France

[73] Assignee: Les Cables de Lyon, Clichy, France

[21] Appl. No.: 601,819

[22] Filed: Apr. 19, 1984

[30] Foreign Application Priority Data

Apr. 22, 1983 [FR] France ................... 83 06617

[51] Int. Cl.$^4$ .................. B29C 47/02; G02B 6/44
[52] U.S. Cl. .................... 264/1.5; 264/167; 264/174; 350/96.34; 425/111; 425/113; 425/376 B; 425/465
[58] Field of Search ............... 264/1.5, 230, 173, 167, 264/174; 425/113, 111, 376 B, 465; 350/96.23, 96.34

[56] References Cited

U.S. PATENT DOCUMENTS

| | | | |
|---|---|---|---|
| 3,461,499 | 8/1969 | Nevin et al | 425/113 |
| 3,642,396 | 2/1972 | Meneidis | 425/113 |
| 4,199,224 | 4/1980 | Oestreich | 350/96.23 |
| 4,420,220 | 12/1983 | Dean et al. | 350/96.23 |
| 4,474,426 | 10/1984 | Yataki | 264/1.5 |
| 4,484,963 | 11/1984 | Anctil et al. | 264/1.5 |

FOREIGN PATENT DOCUMENTS

B1036411/78 of 0000 Australia .

| | | | |
|---|---|---|---|
| 2519050 | 11/1976 | Fed. Rep. of Germany | 350/96.23 |
| 2497964 | 7/1982 | France | 350/96.23 |

Primary Examiner—James Lowe
Attorney, Agent, or Firm—Sughrue, Mion, Zinn, Macpeak & Seas

[57] ABSTRACT

A method of manufacturing an optical fiber cable involves embedding a traction-resistant axial strength member of at least one wire of precipitation hardened martensitic steel in a rod of thermoplastic material extruded thereabout while forming longitudinal grooves or cavities in the periphery while subjecting the rod and the strength member to an initial axial traction stress, extending them by less than their elastic limits, disposing optical fibers in the grooves or cavities of the rod while still under axial traction stress, and removing the axial traction stress. An extrusion machine has a head terminating in an axial outlet. A fixed member extends around a rotary die supporting the die on bearings internally of the fixed member. The fixed member is fixed to the front face of the extrusion machine and supports a die inlet axially spaced from the front face and the head outlet to ensure that a small controlled amount of plastic material leaks radially at the gap to the exterior. The axial strength member is fed through the extrusion machine head and the rotary die and embedded in the rod of thermoplastic material while grooves are formed in the outer periphery of the rod.

7 Claims, 2 Drawing Figures

METHOD AND APPARATUS FOR MANUFACTURING AN OPTICAL FIBER CABLE

The present invention relates to a method of manufacturing an optical fiber cable comprising a traction-resisting axial strength member embedded in a rod of thermoplastic material provided with longitudinal grooves or cavities in its periphery in which optical fibers are received, the rod being surrounded by a protective sheath. The invention also relates to apparatus for implementing the method.

BACKGROUND OF THE INVENTION

Published German patent specification No. 2 519 050 describes a rod of plastics material which is reinforced by an axial metal wire and which has a star-shaped cross section to provide longitudinal cavities. The rod is subjected to axial traction within its elastic limit, and optical fibers are inserted in the cavities while the rod is elongated by the traction. The traction is then released so that the fibers take up a degree of slack in the longitudinal cavities. However, the rod and the metal strength member have very different coefficients of elasticity under tension, and the elastic limit of common metals is too small to ensure that the optical fibers are not themselves subjected to excessive traction stress while the cable is being handled or laid. Furthermore, plastics materials tend to elongate in a manner which is partially irreversible. Thus, this prior method fails to avoid putting excessive traction stress on the optical fibers, and there is a danger of the fibers breaking.

Preferred implementations of the present invention provide a method of making an optical fiber cable in which the optical fibers have enough slack in their longitudinal grooves or cavities to ensure that they are not subjected to dangerous levels of traction stress during cable handling or laying, thus avoiding the risk of breakages.

SUMMARY OF THE INVENTION

The present invention provides a method of manufacturing an optical fiber cable comprising a traction-resisting axial strength member embedded in a rod of thermoplastic material provided with longitudinal grooves or cavities in its periphery in which optical fibers are received, the rod being surrounded by a protective sheath, wherein: the axial strength member is constituted by at least one wire of precipitation hardened martensitic steel; and said method comprises; subjecting the rod and the strength member to an initial axial traction stress extending them by less than their elastic limits; disposing optical fibers in the grooves or cavities of the rod while under said axial traction stress; and then removing said axial traction stress.

The method preferably includes at least one of the following features:

the axial strength member is a cord constituted by a central wire with six wires surrounding the central wire;

the steel of the strength member is an alloy including 17% to 19% nickel, 8.5% to 9.5% cobalt, 4.5% to 5.5% molybdenum, 0.4% to 0.8% titanium, and at most 0.03% carbon, the percentages being by weight, and the alloy is heat treated at 480° C. for at least 4 hours under an atmosphere of nitrogen or inert gas or under a vacuum;

the strength member is subjected to an initial elongation of 1.1% to 1.4%; and for manufacturing a cable having helical grooves, thermo-plastic material is extruded around the strength member, and the strength member surrounded in said extruded thermo-plastic is passed through a rotary die immediately downstream from the extrusion zone, said rotary die being unheated.

The present invention also provides apparatus for implementing the above-defined method, the apparatus comprising an extrusion machine having a head incorporated in a hot plate including heating means, and a rotary die separated from the front face of the extrusion machine by a small gap and fitted with bearings which are situated far enough from the hot plate to avoid being excessively heated thereby, said bearings being received inside a fixed member which includes means for centering the rotary die.

Preferably, the connection between the said extrusion machine and the said fixed member in which the rotary die and bearings are received includes removable shims for adjusting the width of the said small gap between the hot plate and the rotary die.

BRIEF DESCRIPTION OF THE DRAWINGS

An embodiment of the invention is described by way of example with reference to the accompanying drawings, in which.

MORE DETAILED DESCRIPTION

Figure 1:
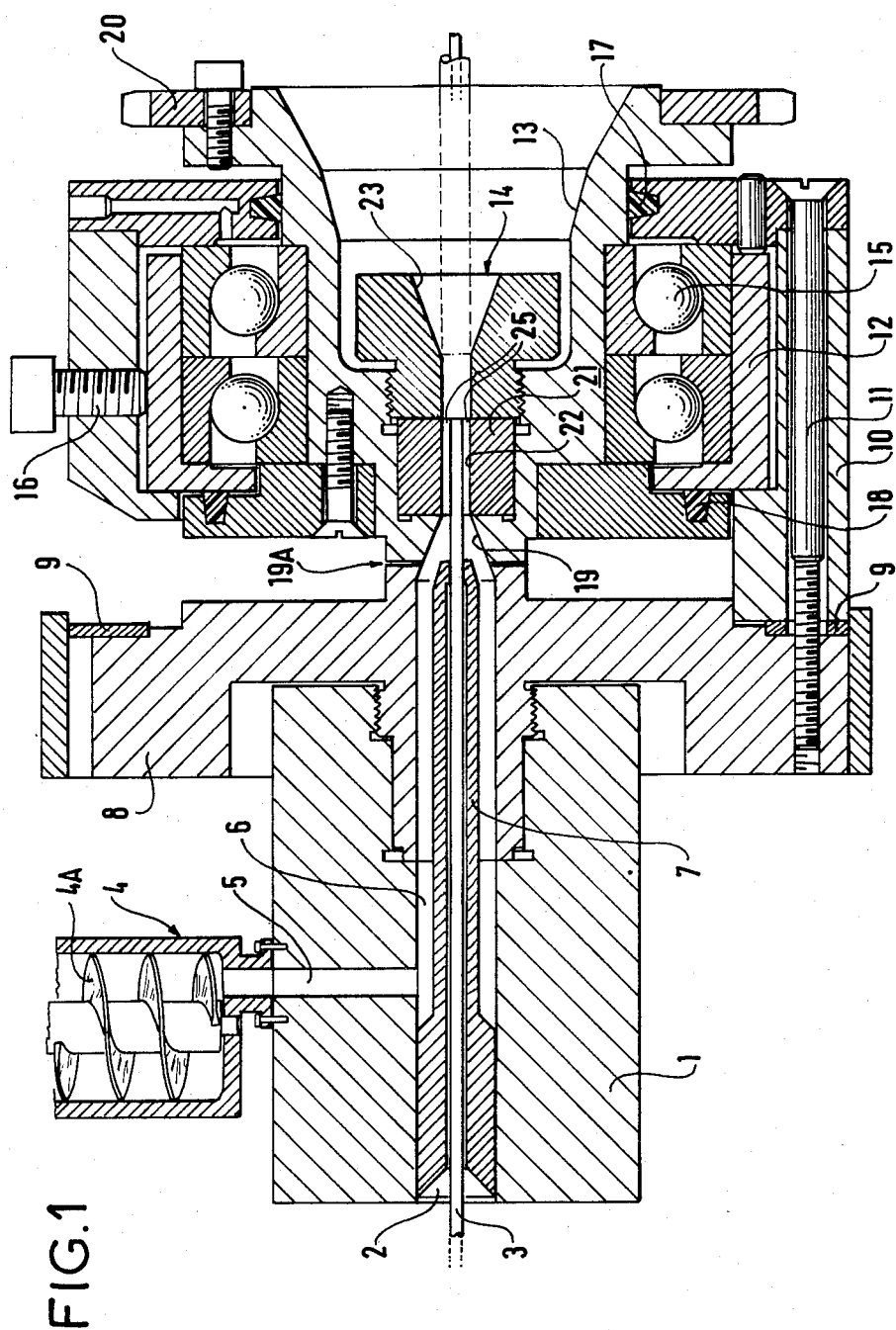
FIG. 1 is an axial section through an extrusion machine with a rotary die for manufacturing the plastics rod of an optical fiber cable in accordance with the invention.

FIG. 1 shows the body 1 of an extrusion machine having a bore 2 at its rear end through which it receives a cord 3 comprising a central wire surrounded by six peripheral wires. The wires are made of precipitation hardened martensitic steel. The steel composition is 17%–19% nickel, 8.5%–9.5% cobalt, 4.5%–5.5% molybdenum, 0.4%–0.8% titanium, and 0.03% carbon. It is heat treated at 480° C. for 4 hours under a nitrogen atmosphere. Such a steel has an elastic limit of 1.3% to 1.4% and a breaking stress of 240 kg/mm$^2$.

The cord is inserted under tension, being stretched between a winch (not shown) to the left of FIG. 1 and a device (also not shown) to the right of the figure for drawing the cord through the extension machine at a higher speed than the speed of advance of the extruded rod, and consequently exerting traction on the rod. The tension may be such that the rod is elongated by 1.1%, for example.

A feeder 4 having an endless screw 4A forces plastics material in the molten state into an annular cavity 6 around an axial pin 7. The plastics material may be polyvinylchloride (PVC) at a pressure of 150 to 300 bars, for example. A hot plate 8 having resistance heater elements (not shown) surrounds the plastics material at the front end of the pin 7. A stationary frame 10 which surrounds a rotary die assembly 13 is connected to the front face of the hot plate 8 by screws 11 which engage in tapped holes in the hot plate. The frame 10 and the hot plate 8 are accurately spaced apart by shim 9.

An inner member 12 of the fixed frame 10 engages the rotary die assembly 13 via two ball bearings 15. The inner member 12 does not include any heater elements, so the ball bearings operate under normal conditions. Gaskets 17 and 18 provide a lubricating oil seal for the ball bearings. The inner member 12 is centered to a high degree of accuracy by means of screws 16, thereby ensuring that the rotary assembly 13 is accurately aligned with the cavity 6 and the pin 7.

The upstream end of the rotary die assembly 13 has a tapering conical inlet 19 leading from the cavity 6 of the extrusion machine to the die per se 21. A small gap 19A is left between the inlet 19 and the hot plate 8 and a small controlled amount of plastics material leaks through the gap. The downstream end of the assembly 13 is surrounded by a toothed ring 20 via which it is driven from a pinion gear wheel (not shown).

Figure 2:
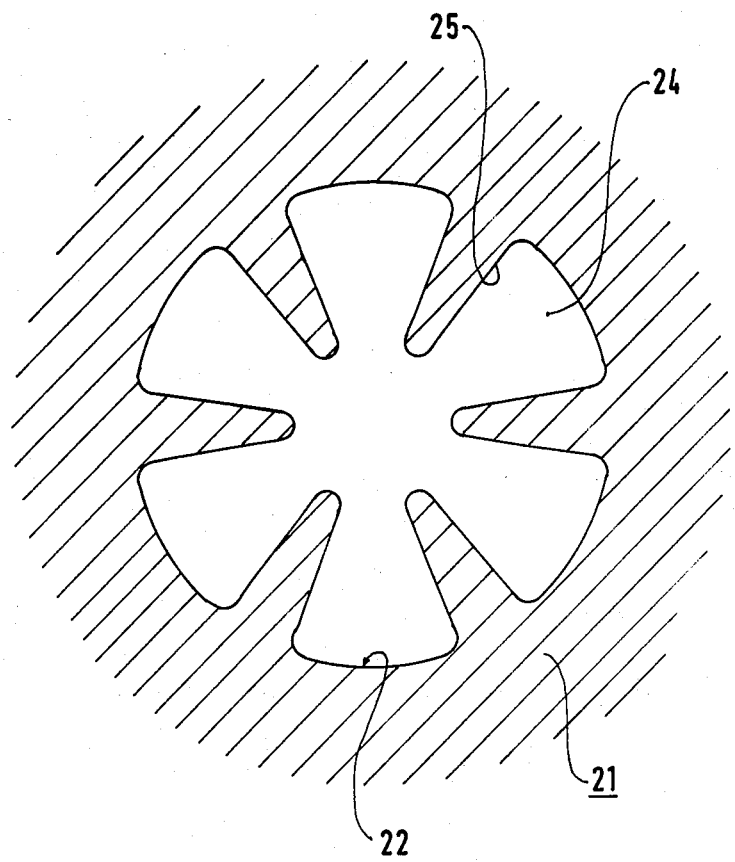
FIG. 2 is a cross section through the rotary die, showing the shape of the grooves in the extruded rod.

The die 21, FIG. 2, has an axial bore 22 through which the plastics material is extruded. The bore 22 has inwardly directed radial lobes uniformly distributed round its circumference forming a star of walls 25 separating partitions 24. The die is machined from the same precipitation hardened martensitic steel as is used for the cord 3. The downstream end of the die 21 is held in place by a nut 23 having an external thread and a smooth bore which flares away from the die 21.

Optical fibers are placed in the grooves in the extruded rod by means not shown (eg. the apparatus described in the applicants' published French patent specification No. 2 497 965 filed Jan. 12, 1981), which means are followed by drawing means exerting traction on the cord and the rod together. Downstream therefrom, a cable core is obtained having optical fibers which are disposed in the grooves of the rod with sufficient slack to protect them from the major part of the traction stresses to which the cable will be subjected during handling and laying. Suppose, for example, that the initial elastic stretching produces an elongation 1.1% and that the cable is likely to be subjected to stress such that it is elongated by 1.5% during laying, the slack in the optical fibers means that they will be subjected to no more than 0.4% elongation, which is well within the elastic limit for optical fibers.

We claim:

1. A method of manufacturing an optical fiber cable comprising the steps of:
   pulling a traction-resisting axial strength member constituted by at least one wire of precipitation hardened martensitic steel of a high coefficient of elasticity through an extrusion machine head under and initial axial traction stress, extruding a thermoplastic material having a coefficient of elasticity substantially matching that of said strength member about the axial strength member to embed the axial strength member in an extruded rod of thermoplastic material with the speed of the axial strength member moving through said extrusion machine head being such that the rod and the strength member are subjected to an initial axial traction stress extending them by less than their elastic limits;
   forming grooves or cavities within the periphery of the rod during thermoplastic material extrusion of said rod, disposing optical fibers in the grooves or cavities of the rod while under said axial traction stress; and
   then removing the axial traction stress such that excessive traction stresses are prevented from occurring to the optical fibers during further handling of the cable.

2. A method according to claim 1, wherein the axial strength member is a cord constituted by a central wire with six wires surrounding the central wire.

3. A method according to claim 1, wherein the steel of the strength member is an alloy including 17% to 19% nickel, 8.5% to 9.5% cobalt, 4.5% to 5.5% molybdenum, 0.4% to 0.8% titanium, and at most 0.03% carbon, the percentages being by weight, and wherein the alloy is heat treated at 480° C. for at least 4 hours under an atmosphere of nitrogen or inert gas or under a vacuum.

4. A method according to claim 3, wherein said step of subjecting said rod and said strength member to an initial traction stress comprises subjecting the strength member to an initial elongation of 1.1% to 1.4%.

5. A method according to claim 1, for manufacturing a cable having helical grooves, wherein said method further comprises the steps of extruding thermo-plastic material around the strength member, and passing the strength member surrounded by said extruded thermoplastic through an unheated rotary die immediately downstream from the extrusion zone.

6. Apparatus for manufacturing an optical fiber cable comprising:
   a traction-resisting axial strength member made of precipitation hardened martensitic steel of a high coefficient of elasticity,
   said axial strength member being embedded in a rod of thermoplastic material having a substantially equal coefficient of elasticity to that of said axial strength member, said rod being provided with longitudinal grooves or cavities in its periphery in which optical fibers are received, the rod being surrounded by a protective sheath,
   said apparatus comprising:
   an extrusion machine having a head incorporated in a hot plate including a heating means, said head terminating in an axial outlet,
   a rotary die having an axial inlet,
   a means connecting said extrusion machine to said rotary die with said head outlet aligned with said die inlet and the said rotary die being separated from the front face of the extrusion machine by a small axial gap of sufficient size to insure that a small controlled amount of plastic material leaks radially at said gap to the exterior of the apparatus,
   a means for feeding thermoplastic material to said head for extrusion through said axial outlet,
   a means for feeding said traction-resisting axial strength member through said extrusion machine head and through such rotary die subjected to an initial axial traction stress and at a velocity of such that the thermoplastic material and the axial strength member are both subjected to initial axial traction stress extending them by less than their elastic limits, said connecting means comprising a fixed member extending around said rotary die fitted with bearings internally, situated downstream of said small axial gap far enough from the hot plate to avoid being excessively heated thereby, screws fixably connecting said fixed member to said extrusion machine head, said fixed member including means bearing on the rotary die for centering the rotary die inlet relative to the head outlet such that said die is freely rotatable internally of said fixed member on said bearing and said rotary die having a bore through which said axial strength member passes and forming longitudinal grooves or cavities in the periphery of the thermoplastic material rod extruded about the axial strength member during passage therethrough, for facilitating the placement of optical fibers within said longitudinal grooves or cavities in the periphery of the thermoplastic material rod downstream of said rotary die while said fixed member maintains said freely rotatable die axially spaced from the axial outlet of said head and separated from the front face of the extrusion machine by said small axial gap.

7. Apparatus according to claim 6, wherein said connecting means includes means connecting said extrusion machine and said fixed member, said fixed member receiving the rotary die and bearings, and said connecting means including removable shims for adjusting the width of said small gap between the hot plate and the rotary die.

* * * * *